Patented Feb. 27, 1940

2,192,000

UNITED STATES PATENT OFFICE 2,192,000

ACTIVATION OF CLAYS

William S. Wilson, Brookline, Mass., assignor to Monsanto Chemical Company, St. Louis, Mo., a corporation of Delaware No Drawing. Application December 19, 1936, Serial No. 116,715

2 Claims. (Cl. 252—2)

This invention relates to a process for imparting bleaching or adsorbent properties to clays or earths which naturally do not possess them and for increasing those of clays or earths which do.

Clays such as montmorillonite, bentonite, kaolinite, fuller's earth and kindred substances are commonly rendered active by acid treatment.

The object of this invention is to provide a method for the activation of clays which will reduce the quantity of acid required and yield a denser product which may be processed more cheaply. In addition, this process is of wide applicability to a large variety of clays and will improve the properties of natural decolorizing earths.

I have discovered that if a mixture of dry clay and concentrated sulphuric acid, that is 90–100 per cent strength be made in a suitable mechanical mixer, so that a nearly perfect distribution of acid and clay is obtained and this mixture be denned or stored in a large, compact mass of such form that the heat of reaction is conserved, its temperature will rise to a point considerably higher than that obtained in any weak acid digestion, and the reaction is completed to nearly theoretical consumption of the sulphuric acid charged. The residual product contains soluble sulphates produced by the acid action and a very small amount of residual free acid, the acid efficiency of the process being from 93–97 per cent. This product may be washed to remove soluble salts and dried, or in certain cases may be directly used as a decolorizer without the washing and drying stages.

I have found that the temperature the reacting mass reaches, using the same apparatus and size of clay charge, is dependent on the quantity and strength of the acid used, being higher for higher strengths of acid or increased acid charge. Considerable heat is evolved during the mixing, but the temperature of the mass does not reach its maximum until stored in the compact mass, when it will rapidly heat up to a temperature of 120°–140° C.

Use of this new process results in a change in the physical structure of the clay or earth so that it now possesses the properties of rapid settling and formation of a compact filter cake of low moisture content on filtration. The volume of the cake compared to the volume of a corresponding product produced by known methods, is in the ratio of 1–1.7; the rate of settling is increased 7–10 fold and, finally, the rate of drying is reduced by nearly one-half. As a result, the output is greatly increased with the same capital investment for settling tanks, filters and dryers, or the same output may be produced with a much smaller capital investment.

I have found that with clays of the bentonite or montmorillonite types which activate with some difficulty this high temperature process yields a product of higher color removal efficiency than methods of extraction involving boiling with a dilute acid. With high grade clays which are readily activated this difference in efficiency is not marked, yet on the other hand, I do not find that my drastic method of treatment causes any decrease in decolorization efficiency as previously published disclosures had caused me to believe.

The quantity of acid to be used is dependent on the type of clay to be activated. The point of maximum efficiency is obtained by the use of 25–50 per cent by weight of 100 per cent $H_2SO_4$. With lower quantities of sulphuric acid the degree of sulphation of the soluble materials will be insufficient to cause complete solution, a lower mass temperature will be obtained, and the desired physical form will not be obtained. For each individual clay there is a definite point where the physical form will change from the difficultly settling to the fast settling state. The point of maximum color removal efficiency of the product will be reached with an acid charge 1–5 per cent higher than that required to reach the sulphation corresponding to this critical physical point.

This type of treatment will markedly increase the decolorizing power of kaolins, and the process is applicable to low grade kaolins with a higher $SiO_2$—$Al_2O_3$ ratio than is normally found in a pure kaolin. It is applicable to bentonites, montmorillonites, mixtures of these, or other types of complex silicates with varying degrees of hydration, and natural decolorizing earths such as fuller's or Florida earth.

I have found that I do not require any heat energy for the reaction beyond that furnished by the reaction itself.

Following is a description of a specific example of how my process may be applied.

Raw clay is dried sufficiently to be ground so that 98 per cent will pass through a 200 mesh screen. The dried product may contain from 5–18 per cent $H_2O$. Grinding or separation to this size is not essential, but I prefer to use a raw material of approximately this screen test since it facilitates the mixing as well as increasing the reaction rate, which generates the maximum amount of heat in a given time. Fifteen hundred (1500) pounds of this ground, partially dried clay is transferred to a mixer of any of the usual types, although I prefer types which produce the greatest amount of intermixing of acid and clay particles, with or without grinding.

Then 375-600 pounds of sulphuric acid (90-100 per cent acidity) are added to the clay as rapidly as possible, without flooding in any locality. The mass in the mixer after the acid addition will consist of fines and aggregates of moist material. The reaction between the clay constituents and acid will take place rapidly with the evolution of heat and formation of steam through evaporation of the moisture present in the clay and water formed by the reaction and the aggregates and lumps will dry out. Acid at ordinary temperatures may be used or it may be heated to 50°-100° C., if it is desired to accelerate the reaction and to cut down the reaction time in the mixer and subsequent storage.

After four or five minutes mixing, the contents of the mixer are discharged into a container capable of taking the complete charge from the mixer, or several mixer charges. This container is so designed that it will have the minimum of heat radiating surface to mass. It may or may not be insulated to decrease heat losses. Here the reaction will continue and the temperature of the mass will increase from 100° C. to 120°-145° C. with evolution of steam. The mixer charge is kept in here for at least two hours, at the end of which time the reaction will be substantially complete and the resulting product will contain from 0.5-2.5 per cent free sulphuric acid. These compact masses may be further treated at the end of this period or may be cooled and stored.

The sulphated clay is then mixed with warm water, the water being added in the ratio of three parts by weight of water to one part by weight of treated clay. By using warm water and hot material directly from the compact mass storage, solution of the soluble salts takes place rapidly and the output of the dissolving tank or mixing box is a slurry of activated clay in a solution of soluble sulphates. This slurry is directly transferred to a filter press, filtered and washed substantially free of soluble salts and acid. The type of structure produced by this method of activation gives a rapidly filtering cake.

Alternatively, the slurry may be transferred to settling tanks, settled and washed, followed by thickening or dewatering in the usual equipment.

In either case the washed and wet cake is dried to a moisture content of 5-20 per cent $H_2O$ at any temperature from 80°-205° C. The aggregates of cake from the drier are then disintegrated and the product separated to any desired fineness. Contrary to results obtained with other methods, the clay may be heated rapidly to temperatures over 200° C. without impairing the activity. The finished product has a density of approximately 70 lbs. per cubic foot, compared with 50 lbs. for activated clays made by known methods.

On the other hand, the hot product from the compact mass storage may be used directly for certain purposes without additional treatment, or its efficiency may be increased by maintaining the product at a temperature of 200°-300° C. for a period of two to three hours. This may be done in any suitable calcining apparatus.

Several varieties of commercial mixers may be used in carrying out my process and many designs for containers for holding the hot compact mass are suitable. The mechanical equipment must be capable of performing practically theoretically perfect mixing of acid and clay under conditions such that the dissipation of heat is at a minimum, and must allow the completion of the reaction at a temperature of 120°-150° C. so that an easily settled, rapidly filterable product consisting of highly porous activated clay will be produced.

What I claim is:

1. The improvement in the activation of clay by means of sulphuric acid, characterized in that the clay to be activated is ground so a substantial proportion passes through a 200 mesh screen and mixed with from 25-50 per cent of its weight of concentrated sulphuric acid, after which the mixture is denned to permit completion of the reaction under conditions which avoid loss of heat generated by the reaction whereby the temperature attains approximately 120°-145° C., thereafter leaching water-soluble salts from the reaction mass by means of water and finally drying the residual clay product.

2. The method of activating clay by means of sulphuric acid, characterized in that clay of a fineness such that approximately 98% passes through a 200 mesh screen and contains from 5 to 18% water is admixed with from 25 to 50% of its weight of substantially 100% $H_2SO_4$, after which the mixture is denned to permit completion of the reaction under conditions which avoid loss of heat generated by the reaction whereby the temperature attains approximately 120° to 145° C., thereafter leaching the water soluble salts from the reaction mass by means of water and finally drying the residual clay product.

WILLIAM S. WILSON.